United States Patent [19]
Lee

[11] Patent Number: 5,813,319
[45] Date of Patent: Sep. 29, 1998

[54] TEMPERATURE MAINTAINING DEVICE OF COFFEE MAKER

[75] Inventor: Kyong-Sik Lee, Suwon, Rep. of Korea

[73] Assignee: Samsung Electronics Co., Ltd., Suwon, Rep. of Korea

[21] Appl. No.: 933,331

[22] Filed: Sep. 18, 1997

[30] Foreign Application Priority Data

Nov. 8, 1996 [KR] Rep. of Korea ...................... 96-52858

[51] Int. Cl.⁶ .................................................. A47J 31/00
[52] U.S. Cl. ................................. 99/299; 99/304; 99/307
[58] Field of Search ............................ 99/279, 280, 300, 99/304, 305, 306, 307, 299; 426/433

[56] References Cited

U.S. PATENT DOCUMENTS

| | | | |
|---|---|---|---|
| 4,888,467 | 12/1989 | Hoffmann | 99/307 X |
| 5,168,794 | 12/1992 | Glucksman | 99/299 X |
| 5,477,775 | 12/1995 | Delhom et al. | 99/299 |
| 5,634,395 | 6/1997 | Jouatel et al. | 99/307 |

*Primary Examiner*—Reginald L. Alexander
*Attorney, Agent, or Firm*—Burns, Doane, Swecker & Mathis, L.L.P.

[57] ABSTRACT

A temperature maintaining device of a coffee maker includes a hot water chamber cover formed between the hot water chamber and the top cover, for closing atmosphere existing therebetween, to prevent temperature of the hot water passing through the hot water chamber to be decreased. The hot water chamber cover has a projection portion which is formed on the one side thereof, for covering the hot water flowing portion on the hot water chamber, and a through hole portion which is formed on the center portion thereof, into which the control knob is rotatably inserted.

2 Claims, 4 Drawing Sheets

TEMPERATURE MAINTAINING DEVICE OF COFFEE MAKER

BACKGROUND OF THE INVENTION

1. Field of the Invention

The present invention relates to a temperature maintaining device for use in a coffee maker, and more particularly, to a temperature maintaining device of a coffee maker which is capable of minimizing cooling of hot water caused due to temperature variation, that is, atmospheric temperature, during the hot water passes through a hot water chamber.

2. Discussion of Related Art

In a conventional coffee maker, as shown in FIGS. 1 and 2, a lower body 10 and an upper body 20 which form appearance thereof are coupled with each other. The upper body 20, which is disposed on the upper side of the lower body 10, includes a water storing tank 21 for storing a predetermined amount of water. Further, the upper body 20 installs a hot water chamber 30 at the one side thereof. On the one side of the hot water chamber 30, a through hole 31 is formed to flow hot water overflowing in a natural dropping manner. A top cover 40 is installed on the upper surface of the hot water chamber 30, which covers the hot water chamber 30 as well as finishes a part of the appearance of the coffee maker.

On the center side of the top cover 40, as shown in FIG. 2, a control knob 50 is rotatably mounted to control the flowing of the hot water within the hot water chamber 30 and to adjust the density of coffee. A filter assembling body 60 is disposed to be left and right turned on the lower side of the hot water chamber 30, in which the hot water discharged from the hot water chamber 30 is mixed with coffee powder P and the mixed material is passed. A storing receptacle 80 is installed on the upper surface of a bottom plate 70 within the lower body 10, in which coffee liquid L extracted from the filter assembling body 60 is stored. A valve assembling body 90 is disposed on the lower end side of the filter assembling body 60, which upwardly operates in accordance with its own seesaw movement, when contacted with the upper portion of the storing receptacle 80, and thus opens its own opening hole to pass the coffee liquid L. A cold water discharging hole 22 is formed on the one side of the bottom surface of the water storing tank 21 within the upper body 20, which is coupled with the one side end of a cold water tube 100 passing through the interior of the lower body 10. A hot water discharging tube 23 is formed on the other side end of the bottom surface of the water storing tank 21, which is coupled with the one side end of a hot water tube 110 passing through the interior of the lower body 10 and conveys the hot water to the hot water chamber 30. A heater 130 is mounted on the inner side of the bottom plate 70, which serves to heat the bottom plate 70 and a circulating tube 120 for circulating the cold water supplied through the cold water tube 100.

The filter assembling body 60 includes a filter net 61 for filtering a rough particle of coffee power and passing only the coffee liquid L, a filter basket 62 provided with the filter net 61 in the inner side thereof and serves as a guide to the coffee liquid L, and a filter body 63 provided with the filter basket 62 in the inner side thereof and finishes the front appearance of the coffee maker.

A reference numeral 150, as shown in FIG. 2, denotes a cap member for covering a hot water flowing portion 32 of the hot water chamber 30, and a reference numeral 160 designates a check valve for preventing the cold water supplied from the water storing tank 21 from flowing reversely in the upward direction, which is comprised of a ball member 161 and a holder member 162 for holding the ball member 161. Further, a reference numeral 170 represents a tank cover for preventing dusts or harmful materials within the water storing tank 21 from being supplied and forms the appearance of the coffee maker, and a reference numeral 180 denotes a connecting tube for connecting the hot water discharging tube 23.

Under the conventional coffee maker as constructed above, after a cold water is poured within the water storing tank 21 and the coffee powder P is supplied within the inner side of the filter net 61, if a power switch(not shown) is turned on, the cold water supplied from the cold water discharging tube 100 to the circulating tube 130 is changed into a hot water according to a heating operation of the heater 140 placed closely with the circulating tube 130. The hot water is expanded to move along the hot water tube 110 and thereafter, ascends along the hot water discharging tube 23 and finally is discharged to the inner side of the hot water chamber 30 through the hot water flowing portion 32.

The hot water flowing in the hot water chamber 30 is dropped to the inner side of the filter net 61 through the through hole 31, and the dropped hot water is mixed with the coffee powder P supplied on the inner side of the filter net 61 and is stored in the storing receptacle 80 according to the operation of the valve assembling body 90 disposed on the lower end of the filter assembling body 60.

In the meanwhile, the coffee liquid L stored in the storing receptacle 80 is kept in a heated state according to the operation of the heater 130, and the heated temperature of the coffee liquid L is adjustable as a thermostat(not shown) is turned on/off.

However, the conventional coffee maker contains the following problem which has to be solved: since the hot water flowing to the hot water chamber 30 through the hot water discharging tube 23 is cooled between the top cover 40 and the control knob 50, as the temperature of the hot water falls, the coffee powder P which is put in the inner side of the filter net 61 is not well mixed with the hot water.

SUMMARY OF THE INVENTION

Accordingly, the present invention is directed to a temperature maintaining device of a coffee maker that substantially obviates one or more of the problems due to limitations and disadvantages of the related art.

An object of the invention is to provide a temperature maintaining device of a coffee maker which is capable of preventing a hot water flowing to a hot water chamber from being cooled due to the contact with the atmosphere, to increase a mixing efficiency of the hot water and coffee powder as well as to decrease an amount of power consumption for maintaining the temperature of coffee liquid mixed at a constant level.

To accomplish this and other objects of the present invention, a temperature maintaining device of a coffee maker having a hot water discharging tube in which a hot water heated by a heater is expanded to be discharged, a hot water chamber which forms a hot water flowing portion on the one side thereof, for guiding the hot water supplied from the hot water discharging tube to a filter assembling body in which coffee powder is put in, and a top cover for covering the upper surface of the hot water chamber and forms an appearance thereof, and a control knob which controls an amount of the hot water dropped to the filter assembling body to thereby is adjust density of coffee liquid, the temperature maintaining device including: a hot water chamber cover formed between the hot water chamber and the top cover, for closing atmosphere existing therebetween, to prevent the temperature of the hot water passing through the hot water chamber to be decreased.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

DETAILED DESCRIPTION OF PREFERRED EMBODIMENT

Reference will now be made in detail to the preferred embodiments of the present invention, examples of which are illustrated in the accompanying drawings.

Figure 1:
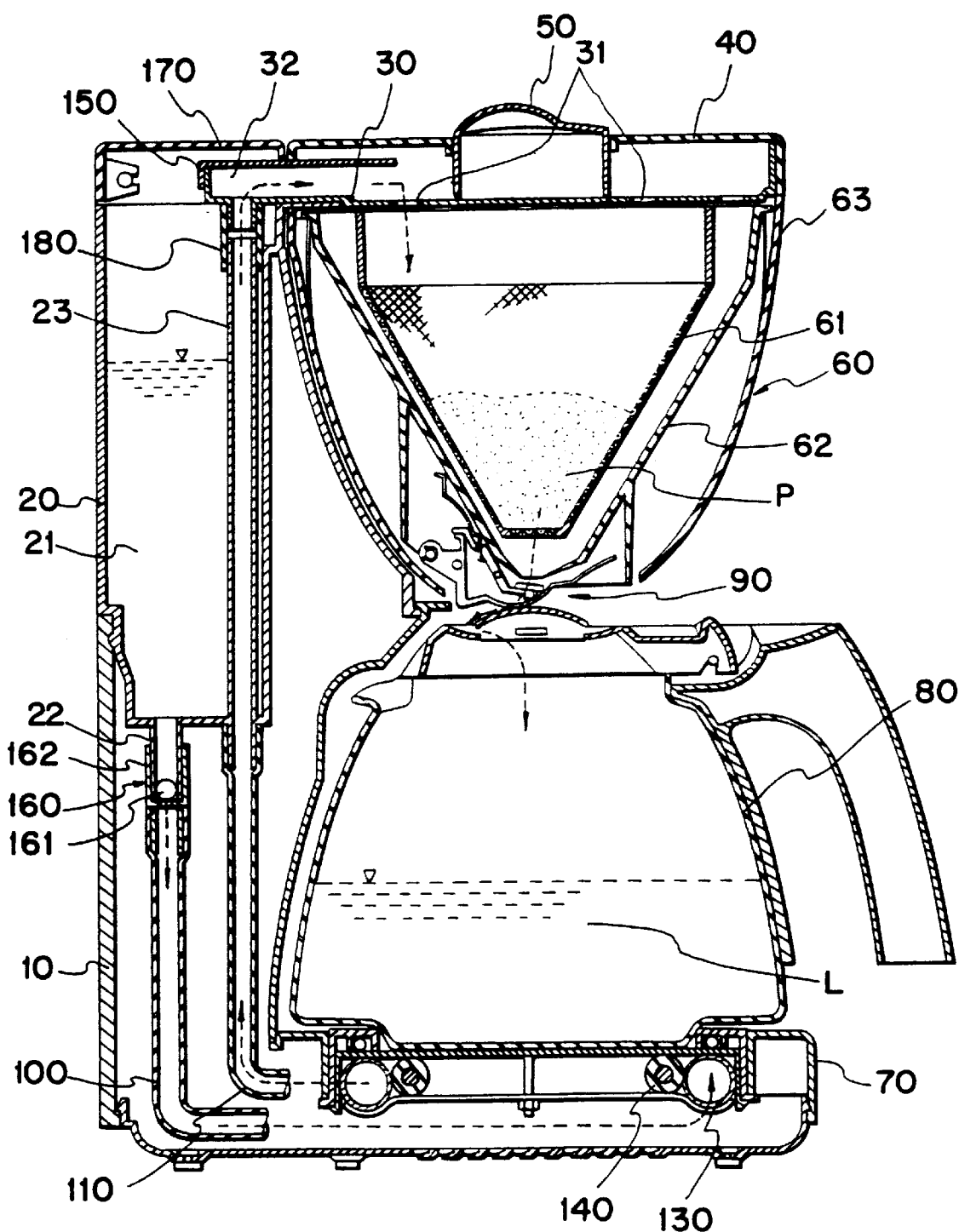
FIG. 1 is a schematically longitudinal sectional view illustrating construction of a conventional coffee maker.
Figure 2:
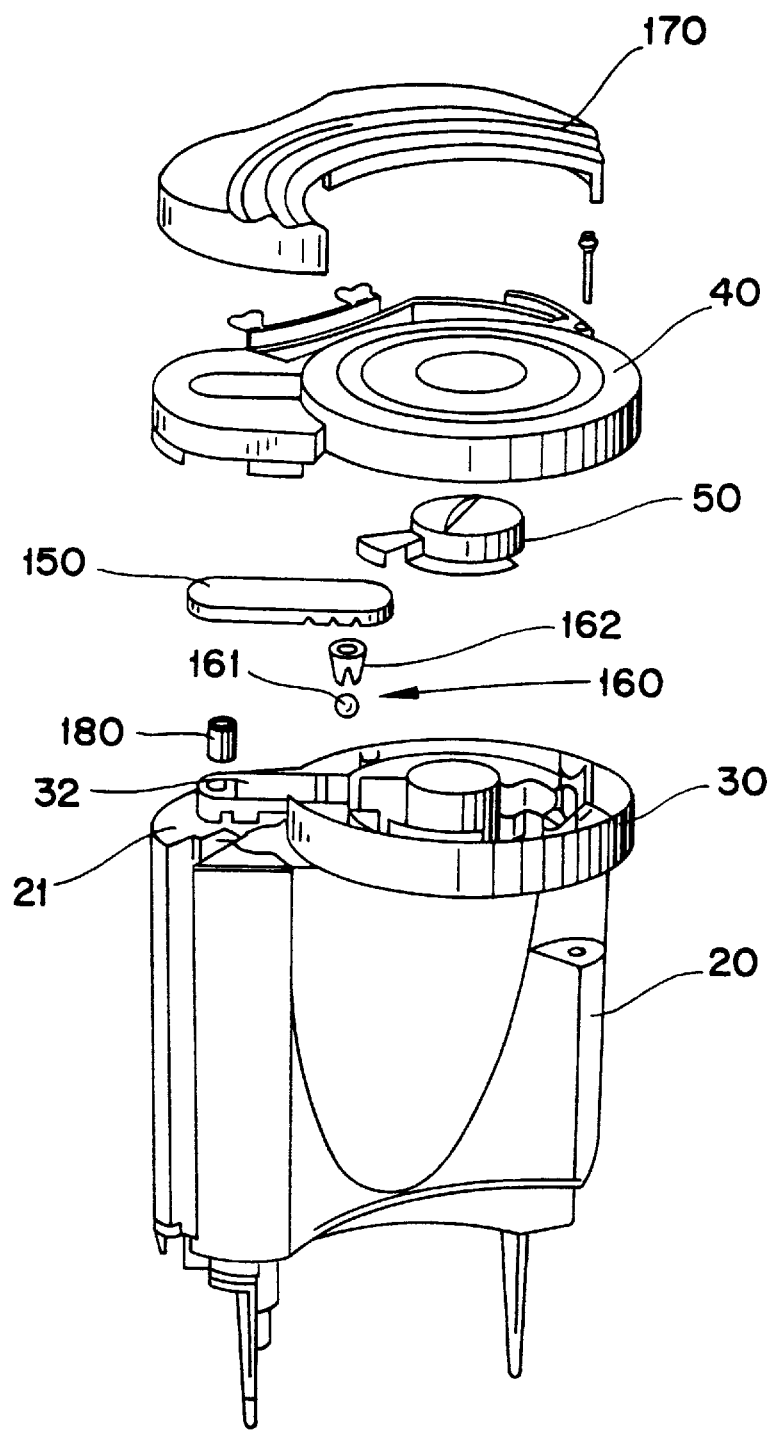
FIG. 2 is a perspective view illustrating a part separated from the construction components in FIG. 1.

First, the construction and effect of a temperature maintaining device of a coffee maker according to the present invention will be in detail discussed with reference to FIGS. 3 and 4. In the preferred embodiment of the present invention, the same parts as those in FIGS. 1 and 2 will be designated with the same reference numerals.

Figure 3:
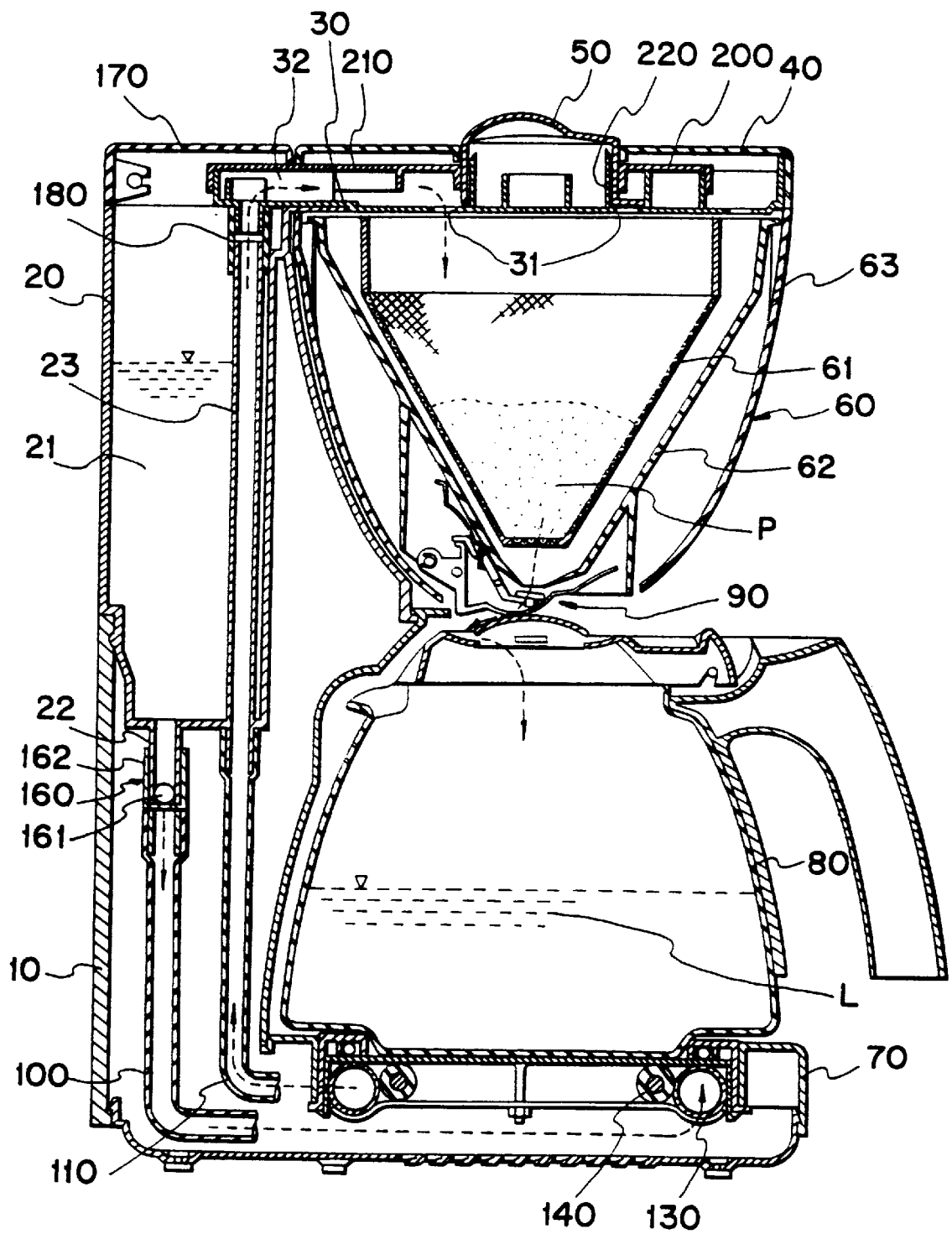
FIG. 3 is a schematically longitudinal sectional view illustrating construction of a coffee maker according to a preferred embodiment of the present invention.
Figure 4:
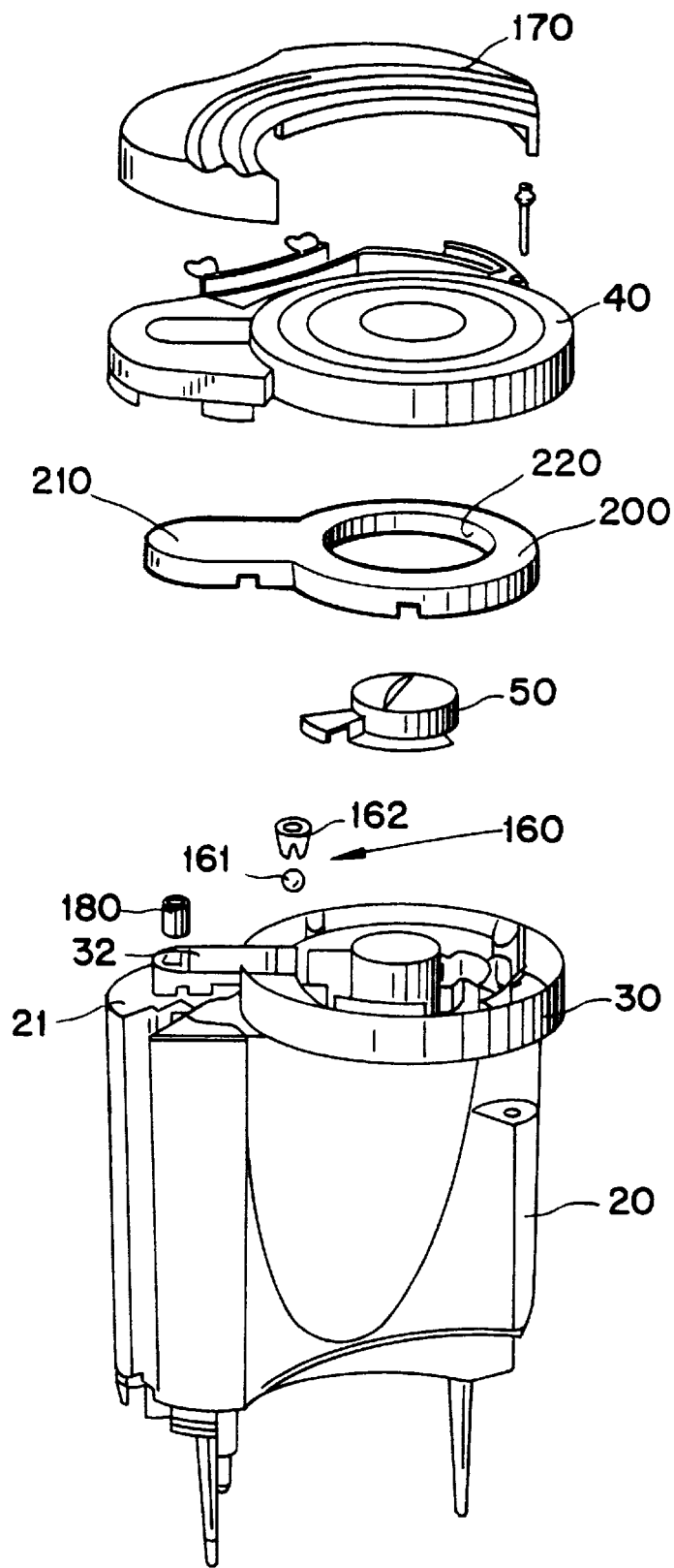
FIG. 4 is a perspective view illustrating a part separated from the construction components in FIG. 3.

In a coffee maker according to the present invention, as shown in FIGS. 3 and 4, a lower body 10 and an upper body 20 which form appearance thereof are coupled with each other. The upper body 20, which is disposed on the upper side of the lower body 10, includes a water storing tank 21 for storing a predetermined amount of water. Further, the upper body 20 installs a hot water chamber 30 at the one side thereof On the one side of the hot water chamber 30, a through hole 31 is formed to flow hot water overflowing in a natural dropping manner. A top cover 40 is installed on the upper surface of the hot water chamber 30, which covers the hot water chamber 30 as well as finishes the appearance of the coffee maker. On the center side of the top cover 40, a control knob 50 is rotatably mounted to control the flowing of the hot water within the hot water chamber 30 and to adjust the density of coffee. A filter assembling body 60 is disposed to be left and right turned on the lower side of the hot water chamber 30, in which the hot water discharged from the hot water chamber 30 is mixed with coffee powder P and the mixed material is passed. A storing receptacle 80 is installed on the upper surface of a bottom plate 70 within the lower body 10, in which coffee liquid L extracted from the filter assembling body 60 is stored. A valve assembling body 90 is disposed on the lower end side of the filter assembling body 60, which upwardly operates in accordance with its own seesaw movement when contacted with the upper portion of the storing receptacle 80 and thus opens its own opening hole to pass the coffee liquid. A cold water discharging hole 22 is formed on the one side of the bottom surface of the water storing tank 21 within the upper body 20, which is coupled with the one side end of a cold water tube 100 passing through the interior of the lower body 10. A hot water discharging tube 23 is formed on the other side end of the bottom surface of the water storing tank 21, which is coupled with the one side end of a hot water tube 110 passing through the interior of the lower body 10 and conveys the hot water to the hot water chamber 30. A heater 130 is mounted on the inner side of the bottom plate 70, which serves to heat the bottom plate 70 and a circulating tube 120 for circulating the cold water supplied through the cold water tube 100.

Meanwhile, a hot water chamber cover 200 is formed between the hot water chamber 30 and the top cover 40 to close a passage formed therebetween, to thereby prevent the temperature of the hot water passing through the hot water discharging tube 23 to be decreased due to the contact with atmosphere.

The hot water chamber cover 200 includes a projection portion 210 which is formed on the one side thereof, for covering the hot water flowing portion 32 formed on the one side of the hot water chamber 30, and a through hole portion 220 which is formed on the center portion thereof, into which the control knob 50 is rotatably inserted.

The filter assembling body 60 includes a filter net 61 for filtering a rough particle of coffee power P and passing only the coffee liquid L, a filter basket 62 provided with the filter net 61 in the inner side thereof and serves as a guide to the coffee liquid L, and a filter body 63 provided with the filter basket 62 in the inner side thereof and finishes the front appearance of the coffee maker.

An explanation of operation of the temperature maintaining device of a coffee maker according to the preferred embodiment of the present invention will be discussed.

After a cold water is first poured within the water storing tank 21 and the coffee powder P is then supplied within the inner side of the filter net 61, if a power switch (not shown) is turned on, the cold water supplied from the cold water discharging tube 100 to the circulating tube 120 is changed into a hot water according to a heating operation of the heater 130 placed closely with the circulating tube 120. The hot water is expanded to move along the hot water tube 110 and thereafter, ascends along the hot water discharging tube 23 and finally is discharged to the inner side of the hot water chamber 30 through the hot water flowing portion 32. The hot water flowing in the hot water chamber 30 is dropped to the inner side of the filter net 61 through the through hole 31, and the dropped hot water is mixed with the coffee powder P supplied on the inner side of the filter net 61 and is stored in the storing receptacle 80 according to the operation of the valve assembling body 90 disposed on the lower end of the filter assembling body 60.

In the meanwhile, the coffee liquid L stored in the storing receptacle 80 is kept in a heated state according to the operation of the heater 130, and the heated temperature of the coffee liquid L is adjustable as a thermostat(not shown) is turned on/off.

During the hot water is moved and the coffee liquid L is formed, the hot water chamber cover 200 formed between the hot water chamber 30 and the top cover 40 serves to close a passage formed therebetween, so as to prevent the temperature of the hot water flowing into the inner side of the hot water chamber 30 to be decreased due to the contact with atmosphere. As a result, the coffee powder P which has put in the inner side of the filter net 61, can be easily diluted. Moreover, as the hot water is maintained at a constant temperature, the operational area of the thermostat, which is turned on/off to heat the coffee liquid L put in within the storing receptacle 80, can be enlarged, to thereby reduce an amount of power consumption.

As apparent from the foregoing, a temperature maintaining device of a coffee maker according to the present invention can install a hot water chamber cover on the upper surface of a hot water chamber which serves to receive a hot water flowing through a hot water flowing tube and to guide the hot water to a filter assembling body, to prevent the contact of the hot water with atmosphere by closing a hot water passage between the hot water chamber and a top cover. Thereby, the temperature maintaining device according to the present invention can give the following advantages: a) falling of the temperature of hot water is suppressed, so the dilution of coffee powder can be improved; and b) as the operational area of the thermostat, which serves to maintaining the coffee liquid at a constant temperature is enlarged, an amount of power consumption can be reduced.

It will be apparent to those skilled in the art that various modifications and variations can be made in a temperature maintaining device of a coffee maker of the present invention without departing from the spirit or scope of the invention. Thus, it is intended that the present invention cover the modifications and variations of this invention provided they come within the scope of the appended claims and their equivalents.

What is claimed is:

1. A temperature maintaining device of a coffee maker having a hot water discharging tube in which a hot water heated by a heater is expanded to be discharged, a hot water chamber which forms a hot water flowing portion on the one side thereof, for guiding the hot water supplied from said hot water discharging tube to a filter assembling body in which coffee powder is put in, and a top cover for covering the upper surface of said hot water chamber and forms an appearance thereof, and a control knob which controls an amount of the hot water dropped to said filter assembling body to thereby adjust density of coffee liquid, said temperature maintaining device comprising:

a hot water chamber cover formed between said hot water chamber and said top cover, for closing atmosphere existing therebetween, to prevent temperature of the hot water passing through said hot water chamber to be decreased.

2. The temperature maintaining device as claimed in claim 1, wherein said hot water chamber cover comprises a projection portion which is formed on the one side thereof, for covering said hot water flowing portion on said hot water chamber, and a through hole portion which is formed on the center portion thereof, into which said control knob is rotatably inserted.

* * * * *